United States Patent
Yanagihara

(10) Patent No.: US 7,825,623 B2
(45) Date of Patent: Nov. 2, 2010

(54) ELECTRIC VEHICLE DRIVE APPARATUS

(75) Inventor: Kenya Yanagihara, Gunma (JP)

(73) Assignee: Mitsuba Corporation, Gunma (JP)

( * ) Notice: Subject to any disclaimer, the term of this patent is extended or adjusted under 35 U.S.C. 154(b) by 463 days.

(21) Appl. No.: 12/080,602

(22) Filed: Apr. 4, 2008

(65) Prior Publication Data

US 2008/0246430 A1 Oct. 9, 2008

(30) Foreign Application Priority Data

Apr. 6, 2007 (JP) .............................. 2007-100603

(51) Int. Cl.
*H02P 3/18* (2006.01)
(52) U.S. Cl. ..................... 318/812; 318/799; 318/811
(58) Field of Classification Search ................. 318/812, 318/703, 799, 811, 831
See application file for complete search history.

(56) References Cited

U.S. PATENT DOCUMENTS

2009/0026998 A1 * 1/2009 Ueno et al. ................. 318/703

FOREIGN PATENT DOCUMENTS

JP 2002-58277 2/2002

OTHER PUBLICATIONS

Patent Abstracts of Japan, Publication No. 2002058277, Feb. 22, 2002, 1 p.

* cited by examiner

*Primary Examiner*—Karen Masih
(74) *Attorney, Agent, or Firm*—Haynes and Boone, LLP; Edward C. Kwok

(57) ABSTRACT

In an electric vehicle drive apparatus having an electric motor and a motor drive device, the electric motor having a stator, a rotor and a moving mechanism capable of changing a relative distance between the stator and the rotor to vary an effective magnetic flux of the motor, the motor drive device compares a regenerative current with a target current during a regenerative control of the motor, and when it is found that the regenerative current is larger than the target current, the distance between the stator and the rotor is increased to reduce the effective magnetic flux.

2 Claims, 4 Drawing Sheets

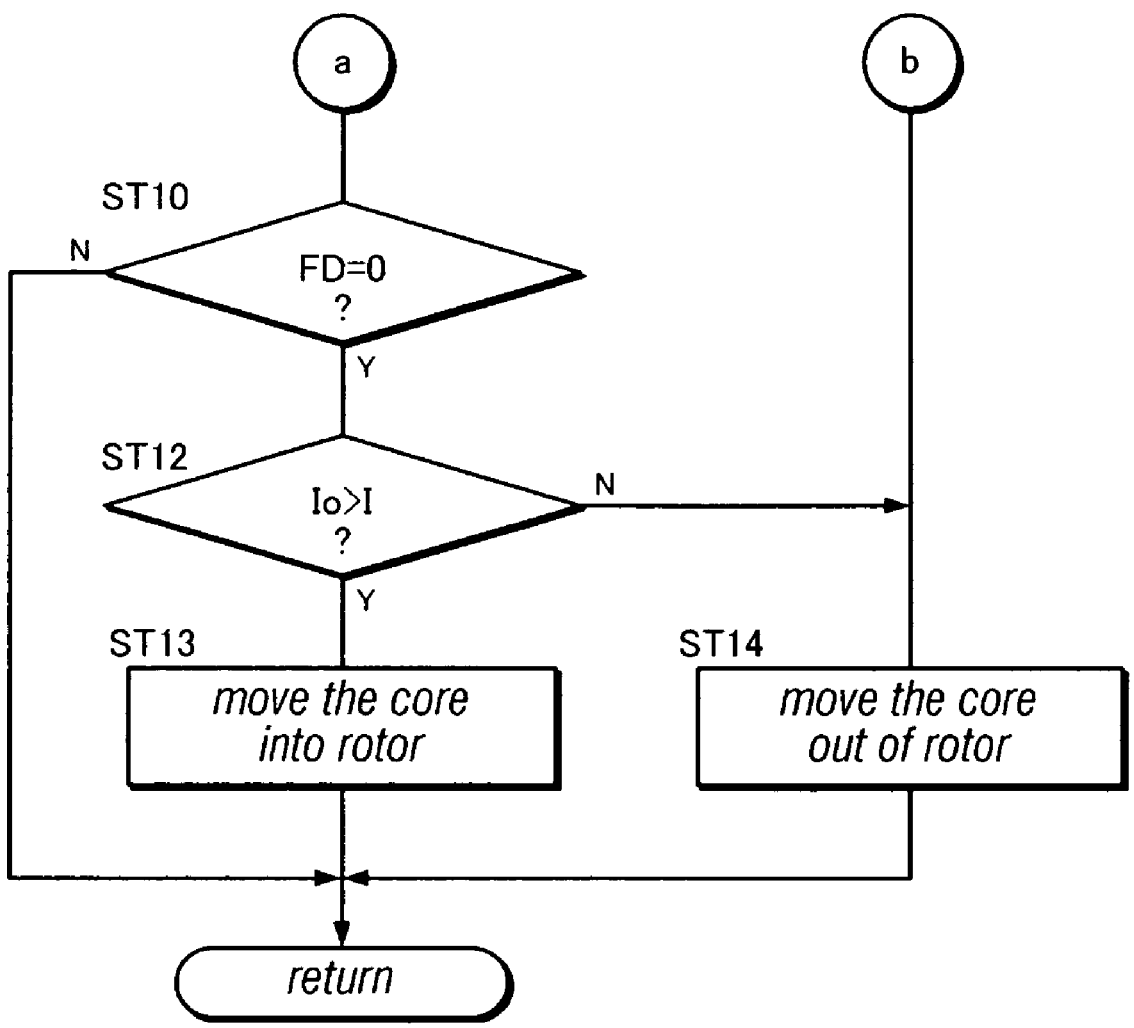

ELECTRIC VEHICLE DRIVE APPARATUS

TECHNICAL FIELD

The present invention relates to a drive apparatus for an electric vehicle.

BACKGROUND OF THE INVENTION

It is conventionally known to use a DC brushless motor as a drive power source of an electric automobile. In order to allow the electric automobile to effect braking similar to the "engine brake" of an automobile with an internal combustion engine when the automobile travels a long downslope, for example, it has been proposed to conduct a regenerative control of the motor (see Japanese Patent Application Publication No. 2002-58277).

As the automobile gains speed while traveling a long downhill with the drive control being suspended, the motor rotation speed can exceed a no-load rotation speed of the motor, and in such a case, a regenerative current flows to the power supply (battery) from the motor via a control device (controller). However, in the conventional drive apparatus for a DC brushless motor, such a regenerative current cannot be controlled, and this may cause an overcharge of the battery or an unfavorable increase of the motor friction due to an excessive increase in the regenerative energy.

In the above publication No. 2002-58277, the motor operation is divided into four mode (or regions) according to the torque and rotation speed, where the four regions comprise a normal field powering control region, a normal field regenerative region, a weak field powering control region, and a weak field regenerative region. For example, the motor may be initially operated in a powering mode with a weak field, and as the rotation speed increases, the motor may be operated in a no-load drive mode (zero torque) and then in the regenerative mode with a weak field.

As a way for reducing the field (or field current), it is known to short-circuit the field coil, insert a resister in the circuit, chopper-control the field current, or conduct field added excitation control, but they are still not satisfactory in achieving both of simple control structure and highly accurate control.

BRIEF SUMMARY OF THE INVENTION

The present invention is made to solve the above prior art problems, and a primary object of the present invention is to provide an electric vehicle drive apparatus having an electric motor and a motor drive device that can conduct appropriate regenerative control for motor rotation speeds over the no-load rotation speed with high precision and in simple structure.

According to the present invention, there is provided an electric vehicle drive apparatus having an electric motor serving as a power source and a motor drive device, wherein the electric motor comprises: a stator; a rotor disposed coaxially with the stator in a rotatable fashion; a coil winding provided to one of the stator and the rotor; a permanent magnet provided to the other of the stator and the rotor so as to oppose to the coil winding; and a moving means capable of moving one of the stator and the rotor in an axial direction of the rotor to change a distance between the stator and the rotor and thereby change an amount of magnetic flux of the permanent magnet that passes through the coil winding, and wherein the motor drive device comprises: a rotation speed detecting means for detecting a rotation speed of the rotor with respect to the stator; a motor current control circuit for controlling a drive current and regenerative current of the motor; a current detection means for detecting the drive current and regenerative current; a target current setting means for setting a target current in a regenerative control of the motor; and a movement control means for, when the rotation speed is higher than a no-load rotation speed during the regenerative control, controlling the moving means to increase the distance between the stator and the rotor if the regenerative current is larger than the target current while controlling the moving means to decrease the distance between the stator and the rotor if the regenerative current is equal to or lower than the target current.

Particularly, in a case where the motor current control circuit operates based on a pulse width modulated control signal (PWM control signal), it will be preferable if the motor drive device further comprises: a duty factor setting circuit for setting a duty factor of the PWM control signal; a PWM control signal generation circuit for generating the PWM control signal according to the duty factor, and provides the PWM control signal to the motor current control circuit; and a fixed duty command circuit for controlling the duty factor setting circuit such that the duty factor set by the duty factor setting circuit is fixed at zero when the movement control means controls the moving means to increase the distance between the stator and the rotor during the regenerative control.

According to the above structure, the regenerative current is compared to the target current during the regenerative control, and when it is found that the regenerative current is larger than the target current, the distance between the stator and the rotor is increased to reduce the field (effective magnetic flux). Therefore, it is possible to prevent an excessive increase in the regenerative current even for motor rotation speeds over the no-load rotation speed. When the regenerative current is smaller than the target current, i.e., when there is a room for increasing the regenerative current, it is possible to reduce the distance between the stator and the rotor to strengthen the field and thereby increase the regenerative current. This can allow an effective use of the regenerative current to prevent an excessive rotation speed of the motor and achieve favorable rotation speed control over the no-load rotation speed.

Particularly, if the duty factor set by the duty factor setting circuit is fixed at zero when the control is conducted to increase the distance between the stator and the rotor, the control of the field can be achieved only by the control of the distance between the rotor and the stator and thus the control can be simplified.

BRIEF DESCRIPTION OF THE DRAWINGS

Now the present invention is described in the following with reference to the appended drawings, in which:

FIG. 4 is a flowchart showing a control flow following that shown in FIG. 3.

DETAILED DESCRIPTION OF THE PREFERRED EMBODIMENTS

Figure 1:
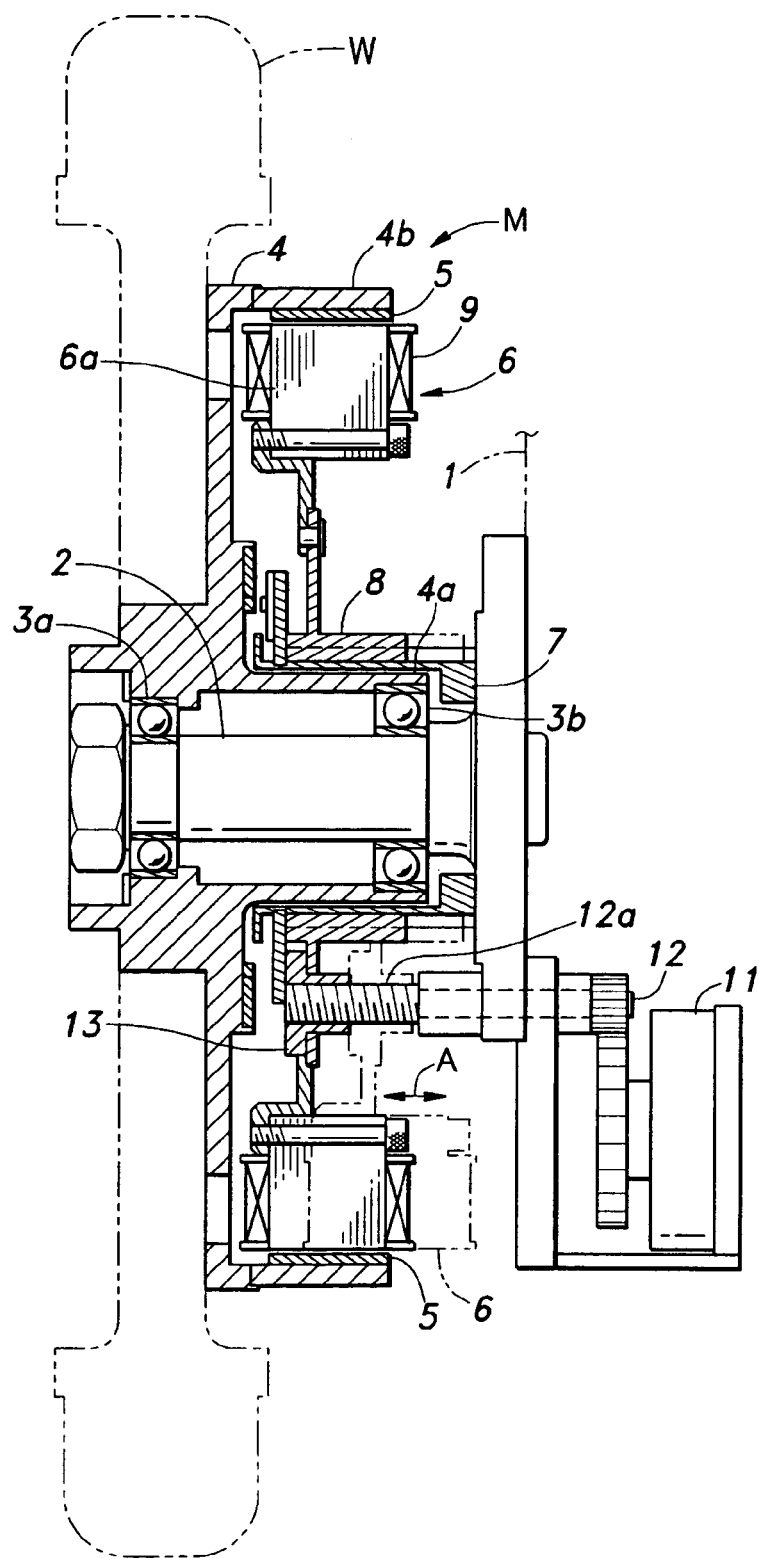
FIG. 1 is a schematic cross-sectional view showing an embodiment in which the present invention is applied to a drive wheel of an electric automobile.

FIG. 1 is a schematic cross-sectional view showing an embodiment in which the present invention is applied to a drive wheel W of an electric automobile. As shown in the drawing, a stationary support shaft 2 extends laterally from a side of a vehicle body 1 and a rotor 4 is rotatably supported by the stationary support shaft 2 via a pair of bearings 3a, 3b. The rotor 4 serves as an outer rotor of a motor. The drive wheel W is attached to an outer periphery of the rotor 4 via a wheel.

The rotor 4 generally has a hollow cylindrical shape with a bottom and is provided with a boss portion in its central part. Thus, the rotor 4 has an inner cylindrical wall 4a defining the boss portion and an outer cylindrical wall 4b concentrically surrounding the inner wall 4a. As seen in FIG. 1, the space between the inner and outer cylindrical walls 4a, 4b is open toward the vehicle body 1. Provided on an inner circumferential surface of the outer cylindrical wall 4b are a plurality of permanent magnets 5 in such a manner that their S and N poles are arranged in a circumferential direction. A stator 6 is received in the space defined between the inner and outer cylindrical walls 4a, 4b.

The stationary support shaft 2 has an outward extending flange that is fixed to the vehicle body 1, and a guide member 7 that surrounds the inner cylindrical wall 4a is secured to the flange. The guide member 7 supports a slide member 8 via serration such that the slide member 8 is moveable in an axial direction of the stationary support shaft 2. An outer cylindrical surface of the slide member 8 is formed with a radially outward extending collar, to which the stator 6 is secured via a bracket and by using screws, for example.

The stator 6 comprises a core 6a that is formed by a stack of steel plates having an annular portion and a plurality of teeth radially protruding from the annular portion, and coils 9 wound around the teeth. Appropriate parts of the annular portion of the core 6a are secured to the bracket attached to the slide member 8 by means of screws, as described above. In this way, the stator 6 and the rotor 4 constitute the motor M, to which the present invention is applied. It should be noted that in the illustrated embodiment, the coils 9 are provided to the stator 6 and the magnets 5 are provided to the rotor 4, but the present invention may not be limited to that structure, and the magnets 5 may be provided to the stator 6 and the coils 9 may be provided to the rotor 4.

The slide member 8 can be reciprocally moved in the axial direction of the stationary support shaft 2 by means of an electric actuator 11 rotated by an electric motor, and the stator 6 that is integral with the slide member 8 is reciprocally moved together with the slide member 8. In the illustrated embodiment, The actuator 11 is connected to the outward extending flange of the stationary support shaft 2 via a bracket. The actuator 11 has a rotation shaft provided with a large gear that is adapted to engage with a small gear formed around an outer surface of an end portion of a drive shaft 12, which extends in a direction of movement of the slide member 8 and is rotatably supported by the outward extending flange of the stationary support shaft 2 and the bracket. A portion of the drive shaft 12 on a side of the slide member 8 is formed with a trapezoid threaded section 12a, and a nut member 13 engaging the threaded section 12a is secured to the collar of the slide member 8. In this way, a moving mechanism (moving means) is configured.

The moving mechanism functions to adjust en effective magnetic flux of the motor M. Specifically, when the drive shaft 12 is rotated by the rotation of the actuator 11, the nut member 13 engaging the threaded section 12a of the drive shaft 12 moves in the axial direction of the drive shaft 12, and this causes the core 6a that is unitary with the slide member 8 to move in an axial direction (indicated by an arrow A in FIG. 1) of the stationary support shaft 2, which is in parallel with the drive shaft 12. As a result, an amount of overlap between an end surface the teeth of the core 6a and a magnetic pole surface of the magnets 5 changes, which in turn increases or decreases the magnetic flux of the magnets 5 that can act upon the core 6a. Thus, the motor M constitutes a variable field brushless motor.

It should be noted that an operation to move the core 6a toward the position indicated by a solid line in FIG. 1 is referred to as "move the core 6a into the rotor 4" while an operation to move the core 6a toward a position indicated by phantom lines in FIG. 1 is referred to as "move the core 6a out of or away from the rotor 4". When the weak field control is not conducted, the core 6a is fully moved into the rotor 4 so as to maximize the effective magnetic flux (solid line in FIG. 1). By moving the core 6a into the rotor 4 (i.e., reducing the relative distance between the rotor and the stator), the effective magnetic flux is increased and thus a larger amount of electric current is caused to flow through the coils 9. By moving the core 6a out of the rotor 4 (i.e., increasing the relative distance between the rotor and the stator), the effective magnetic flux is decreased and thus a smaller amount of electric current is caused to flow through the coils 9.

Figure 2:
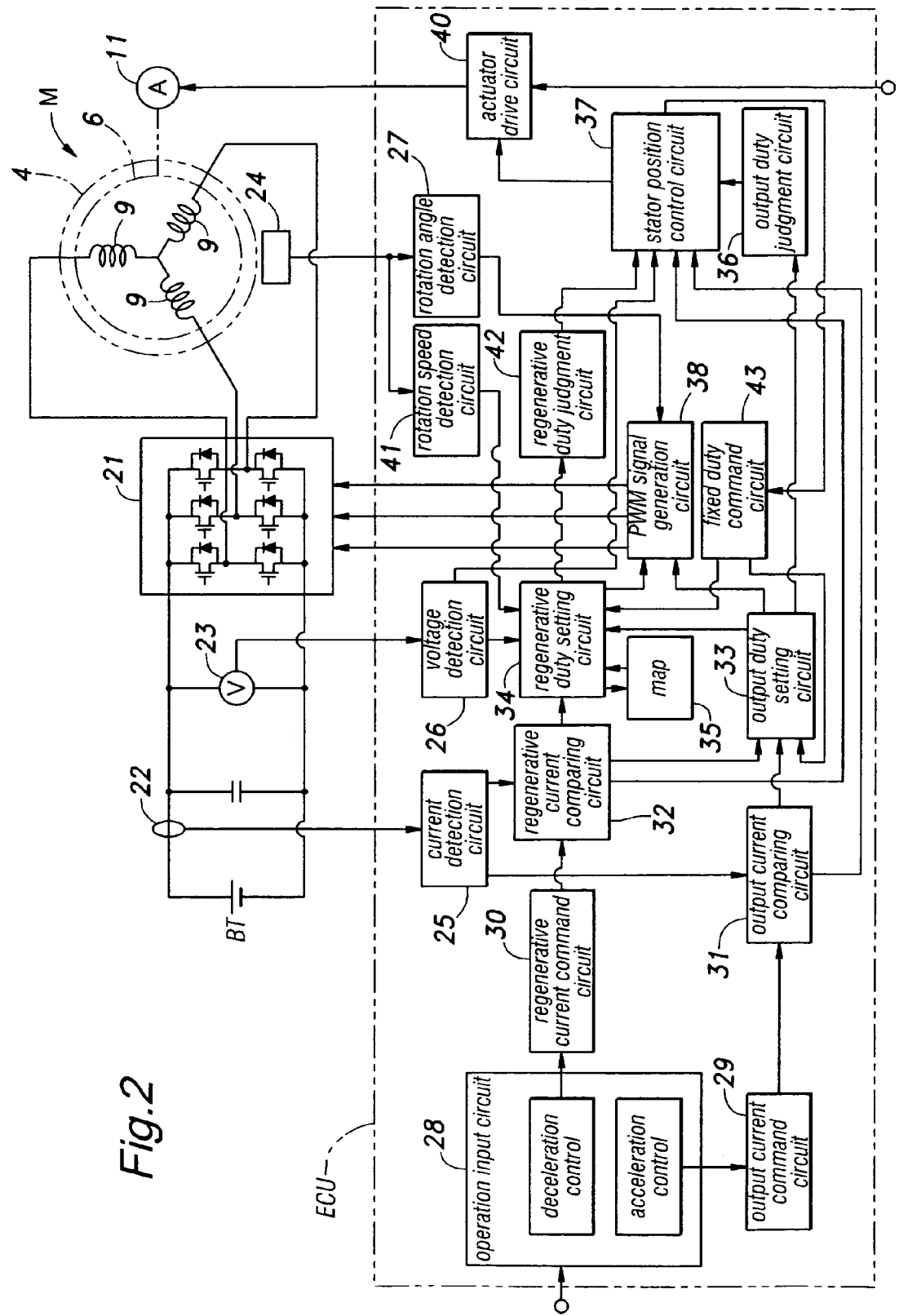
FIG. 2 is a block circuit diagram of a drive circuit according to the present invention.

Next, with reference to the block circuit diagram of FIG. 2, a control structure according to the present invention will be described hereinafter. It should be noted that the basic structure of the illustrated motor M can be the same as that of a three-phase brushless motor.

In the illustrated embodiment, an onboard battery BT serving as a power supply is connected to the coil 9 of each phase of the motor M via an inverter 21 constituted by a plurality of FETs and serving as a motor current control circuit. Provided on the power lines connecting the battery BT and the inverter 21 are a current sensor 22 and a voltage sensor 23, and the current signal and voltage signal detected by these sensors are input to a current detection circuit 25 and a voltage detection circuit 26 of a control circuit ECU, respectively. The control circuit ECU serves as a motor drive device. The motor M is equipped with a rotation sensor 24 for detecting a rotation angle of the rotor 4, and the rotation angle signal is forwarded to a rotation angle detection circuit 27 and a rotation speed detection circuit 41. The rotation angle detection circuit 27 calculates a rotational position (angle position) of the rotor 4 with respect to the stator 6, while the rotation speed detection circuit 41 calculates a rotation speed of the rotor 4 with respect to the stator 6.

Further, the control circuit ECU comprises: an operation input circuit 28 for receiving an external operation signal that can be a signal input from an accelerator opening sensor (not shown in the drawings), for example, and outputting an acceleration/deceleration control signal in response to the external operation signal; an output current command circuit 29 to which an acceleration control signal from the operation input circuit 28 is input; a regenerative current command circuit 30 to which a deceleration control signal from the operation input circuit 28 is input; an output current comparing circuit 31 for comparing an output signal from the output current command circuit 29 with that from the current detection circuit 25; a regenerative current comparing circuit 32 for comparing an output signal from the regenerative current command circuit 30 with that from the current detection circuit 25; an output duty setting circuit 33 to which an output signal from the output current comparing circuit 31 is input; a regenerative duty setting circuit 34 to which an output signal from the regenerative current comparing circuit 32 is input; a map 35 that is connected to the regenerative duty setting circuit 34 and stores beforehand regenerative duty factors set for rotation speeds in accordance with the motor characteristics; an output duty judgment circuit 36 to which a target duty signal generated by the output duty setting circuit 33 is input; a PWM signal generation circuit 38 for generating a pulse width modulated signal (PWM signal) based on each target duty signal from the output duty setting circuit 33 and the regenerative duty setting circuit 34 and providing the PWM signal to the inverter 21 as a control signal in accordance with the duty factor; a regenerative duty judgment circuit 42 for judging whether or not to conduct regenerative duty control based on the target duty signal from the regenerative duty setting circuit 34 and determining a limit of the duty control; a stator position control circuit 37 for setting a target position of the stator 6 based on the output signal from the output current comparing circuit 31 or the regenerative current comparing circuit 32, the voltage detection signal from the voltage detection circuit 26, and a judgment signal from the regenerative duty judgment circuit 42; an actuator drive circuit 40 (serving as a movement control means) for providing the actuator 11 with a drive signal based on a stator position signal from the stator position control circuit 37 or an external stator position operation means; and a fixed duty command circuit 43 for providing a fixed duty command signal to the output duty setting circuit 33 and the regenerative duty setting circuit 34 based on the stator position signal from the stator position control circuit 37.

The stator position control circuit 37 may be adapted to generate the stator position signal based on a priority order of the signals input thereto or a combination of the input signals. Further, the above circuits may comprise those embodied by ICs and those embodied by program control of a CPU.

As described above, the illustrated motor M is configured to allow the relative distance between the stator 6 and the rotor 4 to be changed in order to variably control the magnetic field (or effective magnetic flux). In such a variable control of the effective magnetic flux, the stator position control circuit 37 calculates the target position of the stator 6 (core 6a), and provides a stator position signal indicating the target position of the stator 6 to the actuator drive circuit 40. The actuator drive circuit 40 outputs a drive signal according to the target position to the actuator 11, which in turn drives the stator 6 (core 6a) to the target position. In this way, the amount of overlap between the magnetic pole surface of the magnets 5 and the end surface of the teeth of the core 6a (i.e., an area of mutually opposing surfaces, which is referred to as "opposing surface area" hereinafter) can be increased or decreased, and hence the effective magnetic flux that passes through the opposing surface area can be increased or decreased. A large opposing surface area will result in the characteristics of motor M of a low-speed and high-torque type while a small opposing surface will result in the characteristics of motor M of a high-speed and low torque type.

Figure 3:
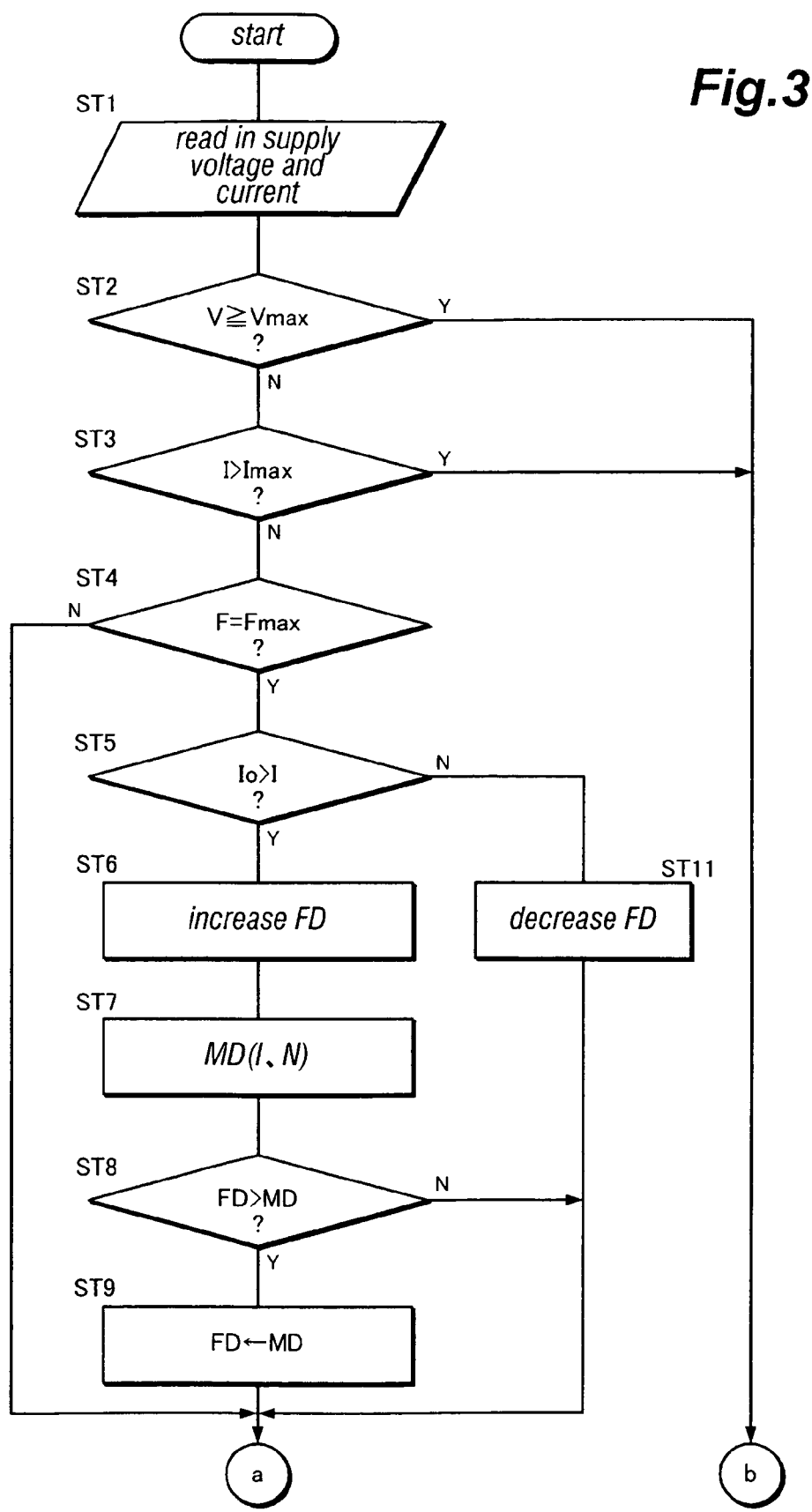
FIG. 3 is a flowchart showing a control flow according to the present invention.

Now, additionally referring to FIGS. 3 and 4, an explanation is made to a way of motor drive control according to the present invention. It should be noted here that as in the conventional PWM control, in the control according to the present invention also, the operation input circuit 28 provides the output current command circuit 29 with an operation signal representing an amount of operation of an accelerator pedal of the automobile, and the acceleration/deceleration control of the motor is carried out by varying the duty factor of the drive signal of the motor according to the operation signal. Such a basic way of motor speed control is conventionally known and thus the detailed explanation thereof is omitted.

In step ST1, the voltage detection circuit 26 detects a power supply voltage V from the output of the voltage sensor 23, and the current detection circuit 25 detects a regenerative current I flowing through the power line from the output of the current sensor 22. It should be noted that the current sensor 22 may also detect the drive current in addition to the regenerative current I, but while the regenerative current command signal is output from the regenerative current command circuit 30, it is considered that the current detected by the current sensor 22 represents the regenerative current I.

In the next step ST2, it is determined whether the power supply voltage V is greater than or equal to an upper limit voltage Vmax or not. If it is determined that the supply voltage V is below the upper limit voltage Vmax, the process proceeds to step ST3, where it is determined whether the regenerative current I is greater than or equal to an upper limit current Imax or not. If it is determined in step ST3 that the regenerative current I is below the upper limit current Imax, the process proceeds to step ST4.

In step ST4, it is determined whether or not a filed F (or effective magnetic flux) of the motor M has reached a maximum field Fmax. As described above, in the illustrated embodiment, the amount of field F is varied by changing the position of the stator 6 by means of the actuator 11. Therefore, the determination in step ST4 can be performed by determining whether or not the stator position signal from the stator position control circuit 37 indicates the position of the stator 6 that has been fully (or most deeply) moved into the rotor 4 (the position shown by solid line in FIG. 1) at which the field F reaches the maximum field Fmax.

When it is determined that the field F has reached the maximum field Fmax in step ST4, the process proceeds to step ST5 where it is determined whether the detected regenerative current I is smaller than a target regenerative current Io or not. This determination can be performed by the regenerative current comparing circuit 32, and the target regenerative current Io may consist of the regenerative current command value from the regenerative current command circuit 30.

When it is determined that the regenerative current I is smaller than the target regenerative current Io, the process proceeds to step ST6 where a regenerative duty factor FD is increased to increase the regenerative current I. The increase of duty factor FD is achieved by setting the duty factor FD by means of the regenerative duty setting circuit 34 according to the comparison result signal from the regenerative current comparing circuit 32. In the next step ST7, a map duty factor MD is read out from the map 35. The map 35 stores in advance a plurality of map duty factors MD that provide the maximum efficiency for varying rotation speeds as map data.

In the next step ST8, it is determined whether or not the regenerative duty factor FD increased in step ST6 is greater than the map duty factor MD read out in step ST7. When it is determined that the regenerative duty factor FD is greater than the map duty factor MD, the process proceeds to step ST9, where the regenerative duty factor FD is made equal to the map duty factor MD, and then the process proceeds to step ST10.

When it is determined in step ST5 that the regenerative current I is greater than the target regenerative current Io, the process proceeds to step ST11, where the regenerative duty factor FD is decreased to reduce the regenerative current I, and the process proceeds to step ST10. When it is determined in step ST8 that the regenerative duty factor FD is below the map duty factor MD also, the process proceeds to step ST10.

In step ST10, it is determined whether or not the regenerative duty factor FD is 0%, and when it is determined that the regenerative duty factor FD is equal to 0%, the process proceeds to step ST12. In the determination in step ST10, the regenerative duty judgment circuit 42 determines whether or not the signal from the regenerative duty setting circuit 34 indicates that the regenerative duty factor FD is 0%.

In step ST12, it is determined whether the regenerative current I is smaller than the target regenerative current Io or not. When it is determined that the regenerative current I is smaller than the target regenerative current Io, the process proceeds to step ST13, while when it is determined that the regenerative current I is greater than or equal to the target regenerative current Io, the process proceeds to step ST14. In step ST13, the core 6a is moved deeper into the rotor 4 to increase the field F, while in step ST14, the core 6a is moved out of the rotor 4 to decrease the field F. The increase/decrease of the field F significantly contributes to efficiently making the regenerative current I correspond to the target regenerative current Io.

In the case where it is determined in step ST2 that the voltage V is greater than or equal to the upper limit voltage Vmax or it is determined in step ST3 that the current I is greater than the upper limit current Imax, the process proceeds to step ST14 as a failsafe measure to move the core 6a out of the rotor 4. This decreases the field F to thereby suppress an excessive increase of the regenerative current I.

When it is determined in step ST10 that the regenerative duty factor FD is 0%, it means that it is not possible to suppress the rotation speed increase by controlling the duty factor. Therefore, when the process proceeds from step ST10 to step ST12, the rotation speed can be higher than the no-load rotation speed. However, in the present embodiment, because the regenerative current I is compared with the target regenerative current Io in step ST12 and the core 6a is accordingly moved deeper into or out of the rotor 4 as described above, the regenerative current I can be favorably controlled even when the rotation speed is higher than the no-load rotation speed. This allows the operation of the motor M of the automobile at rotation speeds higher than the no-load rotation speed. In such a case, the chopping duty is zero, i.e., all of the FETs of the inverter 21 are in the off state.

In the case where the rotation speed is lower than a target rotation speed and it is determined in step ST4 that the field F has reached the maximum field Fmax (i.e., the core 6a is fully moved into the rotor 4), the regenerative duty factor FD is increased or decreased according to the determination in step ST5 as to the amount of current I with respect to the target current Io, and the PWM control is conducted accordingly. In this case, the chopping frequency is constant.

Further, in the case where the rotation speed corresponds to the no-load rotation speed during increase of the rotation speed, when the regenerative duty judgment circuit 42 determines that the chopping duty from the regenerative duty setting circuit 34 becomes zero, the stator position control circuit 37 outputs a position signal to start drawing the core 6a out of the rotor 4 and the fixed duty command circuit 43 outputs a command for fixing the chopping duty at zero. In the case where the rotation speed corresponds to the no-load rotation speed during decrease of the rotation speed, when the signal from the regenerative current comparing circuit 32 indicates that the detected current I exceeds the target current Io, the stator position control circuit 37 outputs a signal for moving the core 6a out of the rotor 4 while when the signal from the regenerative current comparing circuit 32 indicates that the detected current I is below the target current Io, the stator position control circuit 37 outputs a signal for moving the core 6a into the rotor 4. When the rotation speed has decreased to such an extent that the core 6a is fully moved into the rotor 4, the stator position control circuit 37 outputs a command to the fixed duty command circuit 43 to stop keeping the chopping duty at zero.

As described above, according to the present invention, when the rotation speed of the motor is higher than the no-load rotation speed such as when the regenerative duty factor is 0%, the regenerative current can be controlled with high precision by controlling the distance between the rotor and the stator (and hence the effective magnetic flux of the motor) based on the comparison result between the regenerative current and the target current. Therefore, the regenerative current can be effectively used in controlling the motor speed while preventing an excessive increase of the regenerative current. Such a control can be achieved by a simple structure that allows the distance between the stator and rotor to be varied.

Thus, the drive apparatus described above can conduct appropriate regenerative control for motor rotation speeds over the no-load rotation speed with high precision and in simple structure.

Although the present invention has been described in terms of preferred embodiments thereof, it is obvious to a person skilled in the art that various alterations and modifications are possible without departing from the scope of the present invention which is set forth in the appended claims.

The disclosure of the original Japanese patent application (Japanese Patent Application No. 2007-100603 filed on Apr. 6, 2007) on which the Paris Convention priority claim is made for the present application is hereby incorporated by reference in its entirety.

The invention claimed is:

1. An electric vehicle drive apparatus having an electric motor serving as a power source and a motor drive device, wherein the electric motor comprises:
   a stator;
   a rotor disposed coaxially with the stator in a rotatable fashion;
   a coil winding provided to one of the stator and the rotor;
   a permanent magnet provided to the other of the stator and the rotor so as to oppose to the coil winding; and
   a moving means capable of moving one of the stator and the rotor in an axial direction of the rotor to change a distance between the stator and the rotor and thereby change an amount of magnetic flux of the permanent magnet that passes through the coil winding,
   and wherein the motor drive device comprises:
   a rotation speed detecting means for detecting a rotation speed of the rotor with respect to the stator;
   a motor current control circuit for controlling a drive current and regenerative current of the motor;
   a current detection means for detecting the drive current and regenerative current;
   a target current setting means for setting a target current in a regenerative control of the motor; and
   a movement control means for, when the rotation speed is higher than a no-load rotation speed during the regenerative control, controlling the moving means to increase the distance between the stator and the rotor if the regenerative current is larger than the target current while controlling the moving means to decrease the distance between the stator and the rotor if the regenerative current is equal to or lower than the target current.

2. The electric vehicle drive apparatus according to claim 1, wherein the motor current control circuit operates based on a pulse width modulated control signal (PWM control signal), and wherein the motor drive device further comprises:
   a duty factor setting circuit for setting a duty factor of the PWM control signal;
   a PWM control signal generation circuit for generating the PWM control signal according to the duty factor, and provides the PWM control signal to the motor current control circuit; and
   a fixed duty command circuit for controlling the duty factor setting circuit such that the duty factor set by the duty factor setting circuit is fixed at zero when the movement control means controls the moving means to increase the distance between the stator and the rotor during the regenerative control.

* * * * *